United States Patent [19]

Bauerschmidt

[11] Patent Number: 5,267,233
[45] Date of Patent: Nov. 30, 1993

[54] RADIO SET FOR AN FDM-TDM-RADIO TRANSMISSION SET

[75] Inventor: Werner Bauerschmidt, Langenzenn, Fed. Rep. of Germany

[73] Assignee: Grundig E.M.V., Fuerth, Fed. Rep. of Germany

[21] Appl. No.: 792,439

[22] Filed: Nov. 15, 1991

[30] Foreign Application Priority Data

Nov. 15, 1990 [DE] Fed. Rep. of Germany ....... 4036418

[51] Int. Cl.[5] .............................. H04B 1/56; H04L 5/14
[52] U.S. Cl. ......................................... 370/29; 370/24; 455/86
[58] Field of Search ............... 370/24, 29, 30, 50, 370/70, 109; 455/78, 79, 84, 86, 87, 83

[56] References Cited

U.S. PATENT DOCUMENTS

| | | | |
|---|---|---|---|
| 2,985,753 | 5/1961 | Goodreau | 455/87 |
| 3,153,194 | 10/1964 | Orwin et al. | 455/87 |
| 3,300,720 | 1/1967 | Kowols | 455/86 |
| 4,231,116 | 10/1980 | Sekiguchi et al. | 455/87 |
| 4,525,835 | 6/1985 | Vance et al. | 370/29 |
| 4,542,531 | 9/1985 | Fukumura | 455/86 |
| 5,123,008 | 6/1992 | Beesley | 370/29 |

Primary Examiner—Douglas W. Olms
Assistant Examiner—Alpus H. Hsu
Attorney, Agent, or Firm—Kane, Dalsimer, Sullivan, Kurucz, Levy, Eisele and Richard

[57] ABSTRACT

The apparatus is a radio set wherein a first auxiliary oscillator is provided in the transmission device which is connected to the transmission mixer and during the reception operation, the transmission path between the transmission mixer and the main local oscillator is interrupted by a switch device. The switching off of the transmission frequency can also be achieved in that the transmission path between the transmission mixer and the first auxiliary oscillator is interrupted or between the transmission mixer and the power supply device of the radio set.

15 Claims, 2 Drawing Sheets

RADIO SET FOR AN FDM-TDM-RADIO TRANSMISSION SET

BACKGROUND OF THE INVENTION

1. Field of the Invention

This invention pertains to a radio set for an FDM-TDM-radio transmission system.

2. Description of the Prior Art

Radio sets for an FDM-TDM radio transmission system wherein the communication transmission is performed by a pair of radio channels with time division multiplexing are known in the prior art. Between transmission and reception periods in duplex operation, rapid switching between the two is required. Therefore, the transmitter must generate no residual signals as this would cause interference by simulating a reception signal. However, a complete switching off of the transmission frequency signal is not possible since high frequency accuracy upon a subsequent switching on would be degraded.

Radio sets with multiple superheterodyne receivers, i.e., receivers with multiple frequency conversion, are known in the prior art. For example, EP-B1-0 089 649 discloses a radio set with a single superheterodyne receiver wherein the high frequency carrier oscillation of the transmission local oscillator is disposed between the receiving modulation carrier frequencies of two adjacent radio channels and is fed to a mixer. In view of the double use of the modulation carrier generated by the local oscillator, not only an oscillator may be omitted in the receiver, but additionally, interference oscillations can be prevented which otherwise would occur in a device with a plurality of oscillators.

However, such a circuit concept is disadvantageous in that the intermediate frequency signal contains, in addition to the modulation of the received signal, modulation signal components emitted from the transmitter.

In order to playback the received signal (for example, a voice signal without any interference), in particular without any cross-talk, the modulation signal components which are emitted by the transmission device of the radio must be substantially removed or suppressed in the receiving device. This was achieved by two different methods. The first method subtracted the input signal fed to the transmission modulator from the output signal of the demodulator in the low frequency baseband. The second method used a modulation of the receiving mixer (conversion from the first to the second intermediary frequency position) with a counter phase signal for modulating the local oscillator.

Combinations of the two aforementioned methods are known and are explained in detail in DE-AS 1 002 805, for example. Two embodiments of a device are described in the subject matter of DE-AS 1 002 805 for compensating for the modulation components caused by the modulation signal, which is disposed between the transmission and receiving device and is provided with one amplifier and phase shifter each. In the above-identified first embodiment, a pure modulation frequency effective compensation is achieved. In the above-identified second embodiment, the compensation is obtained by multiple or additional modulation.

In order to accommodate the public's desire for mobile telephonic communication, mobile radio service have been further developed during the past few years, which may be roughly defined by the applications of radio telephone service—radio calling service and other mobile radio services such as data radio and service radio. Also by using cordless telephones, the mobility of the user can be expanded. Thereby, the communication transmission between a base station and the associated hand-held mobile station of the cordless telephone is performed through a pair of radio channels, whereby with respect to the radio transmission technique with a cordless telephone the same procedure may be followed as used in a radio device. The cordless telephones which are presently used in the Federal Republic of Germany have a transmitting capacity of ten milliwatts or more. The cordless telephones called CTI have forty radio channels (with FDMA, Frequency Division Multiple Access) available in the 900 MHz frequency band for communication transmission. The bandwidth of a radio channel is 25 kHz, whereby the spacing of the two radio channels required for the duplex operation 45 MHz. Newer cordless telephones named CTL+ have a total of 80 radio channels each two by twenty-five kHz in the frequency band of 885–887 MHz for the first transmitting direction and in the frequency band of 930–932 MHz for the second transmitting direction, so that a total of 4 MHz available frequency bandwidth can be used.

In addition to the aforementioned FDM-radio transmission system, FDM-TDM-radio transmission systems are known wherein the two multiplex methods, frequency multiplexing and time multiplexing, are used for the communication transmission. An example is the future DECT (Digital European Cordless Telephone), wherein, in all likelihood, twelve duplex channels will be available on one carrier by means of time division multiple access, time division duplex (TDMA - TDD). The twelve or thirteen modulation carriers are expected to be in the frequency band of 1.88 to 1.9 GHz, whereby about 150 radio channels may be used with a frequency bandwidth of about 20 MHz for the communication transmission. Embodiments which may be used as transmitting/receiving devices are, for example described in U.S. Pat. No. 4,903,257 or in EP-A2-0 333 419.

In the radio device disclosed in EP-A2-0 292 996, a main local oscillator is provided which is connected to the transmission mixer as well as to the first receiving mixer. The conversion of the transmission signal into the transmission frequency position is performed in the transmitting device, while the conversion of the received signal into the intermediary position is performed in the first receiving mixer. Thus, the transmitting and receiving frequency of the two radio channels required for the duplex operation are equal, whereby the separation of the transmission direction is achieved by using time multiplexing. For this purpose, one bit rate converter is provided in the transmission direction as well as in the receiving direction for increasing or reducing the bit rate of the transmitting and receiving signal.

In a transmitting and receiving circuit wherein the transmission and reception frequencies are equal, a rapid switching between transmission and reception is made possible by two embodiments of a switch circuit which are disclosed in the radio device of EP-A2 0 292 996. In the first embodiment, a reversing switch is disposed between the transmission and reception amplifier, while in the second embodiment, an additional switch is disposed between the transmission mixer and transmission amplifier. In the embodiment known from EP-A2-0 333 419 relating to a transmission and reception device, the switching off of the transmitter in the receiving operating by turning off the transmission amplifier.

As practical tests of such a concept for the switching over between the transmission and reception operation have shown that residual signals of the transmitter appear in the receiving frequency range thereby simulating and interfering with a receiving signal. A complete turning off of the transmission frequency is not possible since high frequency accuracy upon a subsequent switching on would be degraded.

OBJECTS AND SUMMARY OF THE INVENTION

It is therefore an object of the present invention to design a radio device in such a manner than the receiving signal does not contain modulation signal components emitted from the transmission device.

In the radio set in accordance with the invention, a first auxiliary oscillator is provided in the transmission device which is connected to the transmission mixer; and during the receiving operation, the transmission path between the transmission mixer and the main oscillator is interrupted by a switch device. The switching off of the transmission frequency can also be achieved in that the transmission path between the transmission mixer and the first auxiliary oscillator is interrupted or between the transmission mixer and the power supply device of the radio set.

The radio device in accordance with the present invention is advantageous in that it is not required to switch on, switch off or reverse frequency, so that a rapid reversal between the transmission and reception operation is possible, so that residuals of the transmission signals do not interfere with the reception operation. Furthermore, it is advantageous that a wide range of applications is provided for devices which use duplex operation, for example, car telephones, service operations, and cordless telephones.

An embodiment of the radio device of the present invention is advantageous in that the frequency of the first auxiliary oscillator can be selected to be unequal with the intermediate frequency, so that possible interference of the reception operation can be reliably prevented in spatially tight structures.

In an embodiment of the radio device of the present invention, a single auxiliary oscillator is used instead of a first and second auxiliary oscillator, so that the circuit design for generated the intermediate frequency can be reduced.

An embodiment of the present radio device of the present invention is advantageous in that duration of transmission fluctuations which occur causing corresponding corrections of the start of receiving and transmission frames, can be corrected in a simple manner and that the signal preparation (that is, the assembly of the transmission frame and insertion of additional bits) can be performed in a simple way and manner.

An embodiment of the present invention includes a voice detector so that the switching off of the transmitter can effect a savings in power. The switching off of the transmitter may also be performed during the pauses of the voice signal as is known from DE-PS 24 15 332. By delaying the voice signal in the flexible storage, this embodiment can prevent the loss of the first syllable or spoken word which sometimes occurs in the reverse switching operation.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

A wide range of applications is provided for the radio device in accordance with this invention. In particular, the devices of the communication technology which use duplex operation. In the different embodiments herein described are not limited to a specific transmission method such as modulation and coding methods, although the embodiments disclosed herein pertain to cordless telephones.

Figure 1:
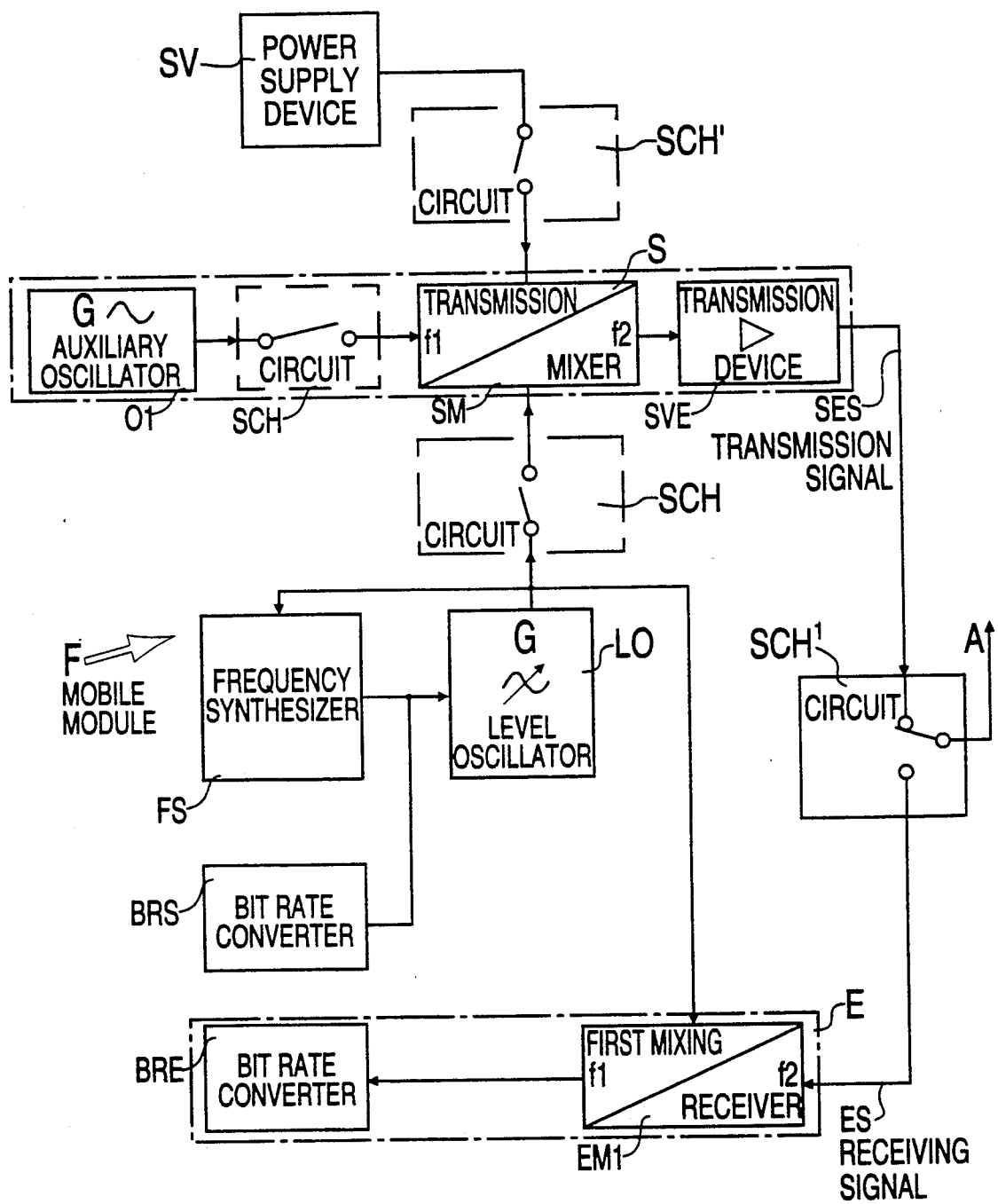
FIG. 1 is a block diagram of a first embodiment of the invention.

Referring now to the drawings in detail wherein like numerals refer to like elements throughout the several views, FIG. 1 is a block diagram of a first embodiment of the radio device in accordance with the present invention. The communication transmission between a base module and the associated mobile module (radio) F of the cordless telephone is performed through a pair of radio transmission channels. The base module may be connected to the main telephone network, so that the user of the mobile module F has access to the public telephone network.

The mobile module F includes, inter alia, a transmission device S, whose transmission mixer SM is connected to a main local oscillator LO for converting the transmission signal into the transmission frequency allocation. Furthermore, a multiple superheterodyne receiving device E is provided, whose first receiving mixer EM1 is connected to the main local oscillator LO for converting the receiving signal ES into the intermediate frequency position. The transmitting and receiving frequency of the two radio channels required for duplex operation are equal. In order to make possible duplex operation through a single pair of radio channels, a bit rate converter BRS and BRE is provided for each channel for increasing or decreasing the bit rate of the transmission and receptions signals SES and SE, respectively, and a switch SCH for reverse switching between the transmission and reception operation (see U.S. Pat. No. 4,903,257). The switching device SCH is connected, on the one hand, with a transmitting and receiving antenna A (see U.S. Pat. No. 4,903,257, in particular see col. 7, lines 37 et seq. and col. 8, lines 10 et seq. for a description of the speed converters 103 and 111, which essentially similar to the bit rate converters BRS and BRE of the instant invention. Similarly, see U.S. Pat. No. 4,525,835, col. 3, line 6 et seq., and col. 4, line 34 et seq. for the description of the bit rate converters with memories 21, 22), and on the other hand with a transmission amplifier SVE.

In accordance with the invention, the transmission device S is provided with a first auxiliary oscillator O1 which is connected with the transmission mixer SM. During the reception operation, the transmission path between transmission mixer SM and main local oscillator LO is interrupted by the switch circuit. The main local oscillator LO may be stabilized, for example, by a frequency synthesizer FS and can be switched to different frequencies. The switching off of the carrier (at the transmission frequency) may be obtained in that the transmission path between the transmission mixer SM and the first auxiliary oscillator O1 is interrupted by the switch SCH or the operating voltage for the transmission mixer SM is switched off.

The output of the main local oscillator LO is connected with the first receiving mixer EM1 for the reception operation, whereby the reception signal ES is converted into the intermediate frequency position. If for this conversion, one directly uses the carrier signal from the main local oscillator LO, then the generated intermediate frequency is equal to the frequency of the first auxiliary oscillator O1. This can result in interference of the reception operation in spatially tight structures.

Figure 2:
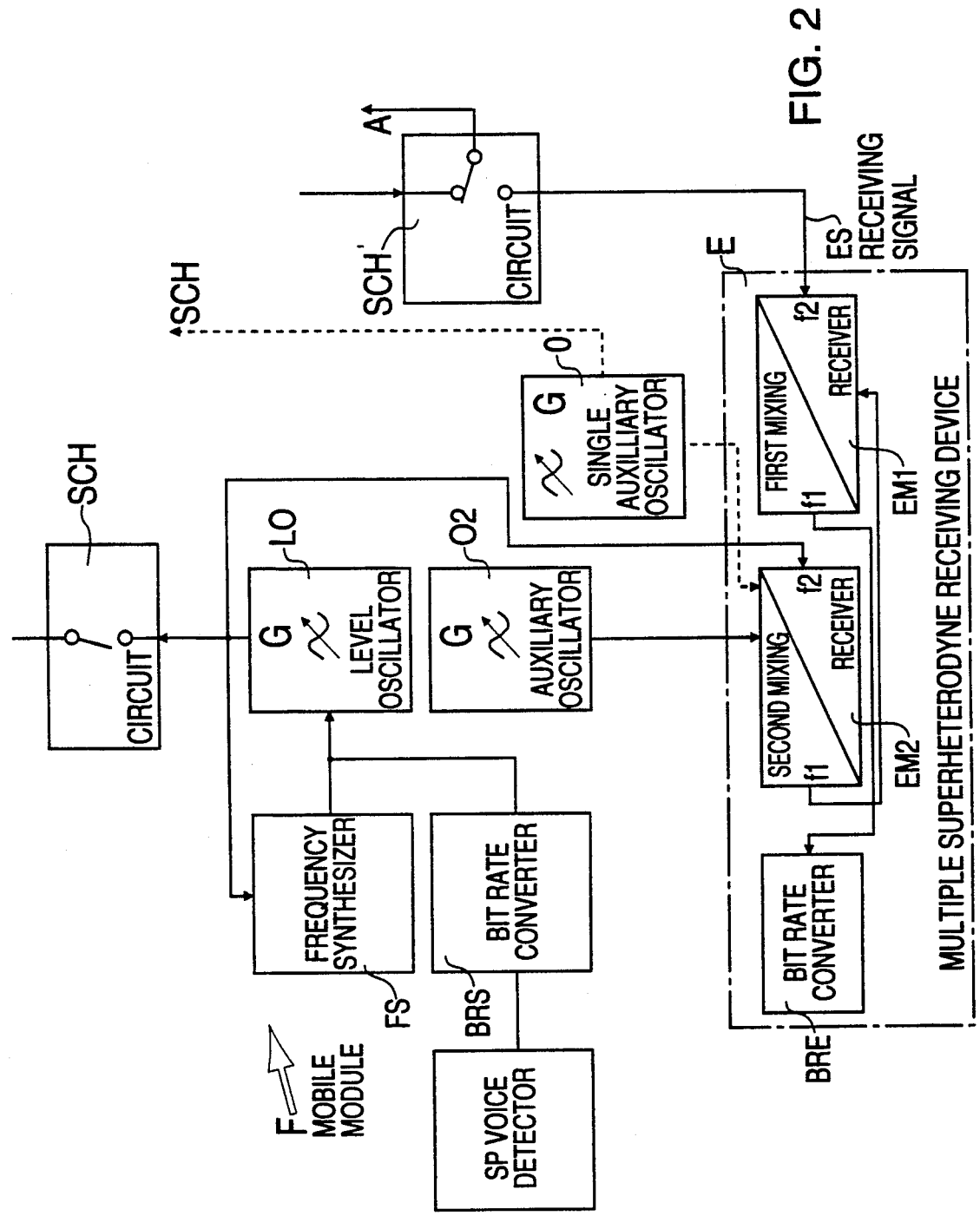
FIG. 2 is a block diagram of a second embodiment of the invention.

In the second embodiment illustrated in FIG. 2, this interference of the reception operation in spatially tight structures is prevented by a second receiving mixer EM2 is provided between the main local oscillator O1 and the first receiving mixer EM1 at the second output of which the output signal of a second auxiliary oscillator O2 is applied. The sum or difference between the frequency from the main local oscillator LO and the second auxiliary oscillator O2 is used for the frequency conversion in the first receiving mixer EM1.

Furthermore, it is also possible (illustrated in broken lines) to use a single auxiliary oscillator O, whereby either the sum or the difference of the frequency of the main local oscillator and auxiliary oscillator O are to be used for the frequency conversion in the transmission mixer SM and first receiving mixer EM1. In this case, the transmission path between the auxiliary oscillator O and transmission mixer SM may be interrupted by the switch SCH during the receiving operation.

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A radio set for a frequency division multiplexed, time division multiplexed radio transmission system including:
   a transmission device including a transmission mixer connected to a main local oscillator to convert the transmission signal into the transmission frequency position, whereby transmission and reception frequency of the two radio channels are equal in a duplex operation;
   a multiple superheterodyne reception device including a first receiving mixer connected to the main local oscillator for converting the received signal into the intermediary frequency position; a first bit rate converter for varying the bit rate of the transmission signals and a second bit rate converter connected to said first receiving mixer for varying the bit rate of the reception signals; a switching means connected to a transmission and reception antenna and for switching between transmission and reception operation connected to a transmission amplifier and to the first receiving mixer; and
   wherein a first auxiliary oscillator means is disposed in the transmission device which is connected to the transmission mixer and wherein during the reception operation the transmission path between said transmission mixer and the main local oscillator is interrupted by the switch means.

2. The radio set of claim 1 further including a second receiving mixer disposed between said main local oscillator and a first input of said first receiving mixer, wherein the output signal of a second auxiliary oscillator means is applied to a second input of said second receiving mixer, and wherein the sum or difference frequencies of from said main local oscillator and said second auxiliary oscillator means is used for frequency conversion in said first receiving mixer.

3. The radio set of claim 1 further including a second receiving mixer disposed between said main local oscillator and a first input of said first receiving mixer wherein the output signal of the first auxiliary oscillator means is applied to a second input of said second receiving mixer and wherein frequency conversion in the transmission mixer and said first receiving mixer uses the sum or difference of frequencies from said main local oscillator and said first auxiliary oscillator means.

4. The radio set of claim 1 wherein said bit rate converter comprises a flexible storage.

5. The radio set of claim 4 further including a voice detector which is connected to said first bit rate converter in a transmitter, thereby introducing a delay corresponding to a time required for detection of a voice signal and wherein at an output of said voice detector a control signal is available for switching off portions of the radio set not required for the reception operation.

6. A radio set for a frequency division multiplexed, time division multiplexed radio transmission system including:
   a transmission device including a transmission mixer connected to a main local oscillator to convert the transmission signal into the transmission frequency position, whereby transmission and reception frequency of the two radio channels are equal in a duplex operation;
   a multiple superheterodyne reception device including a first receiving mixer connected to the main local oscillator for converting the received signal into the intermediary frequency position; a first bit rate converter for varying the bit rate of the transmission signals and a second bit rate converter connected to said first receiving mixer for varying the bit rate of the reception signals; a switching means connected to a transmission and reception antenna and for switching between transmission and reception operation connected to a transmission amplifier and to the first receiving mixer; and
   wherein a first auxiliary oscillator means is disposed in the transmission device which is connected to the transmission mixer and wherein during the reception operation the transmission path between said transmission mixer and the first auxiliary oscillator means is interrupted by the switch means.

7. The radio set of claim 6 further including a second receiving mixer disposed between said main local oscillator and a first input of said first receiving mixer, wherein the output signal of a second auxiliary oscillator means is applied to a second input of said second receiving mixer, and wherein the sum or difference of frequencies from said main local oscillator and said second auxiliary oscillator means is used for frequency conversion in said first receiving mixer.

8. The radio set of claim 7 further including a second receiving mixer disposed between said main local oscillator and a first input of said first receiving mixer wherein the output signal of the first auxiliary oscillator means is applied to a second input of said second receiving mixer and wherein frequency conversion in the transmission mixer and said first receiving mixer uses the sum or difference of frequencies from said main local oscillator and said first auxiliary oscillator means.

9. The radio set of claim 6 wherein said bit rate converter comprises a flexible storage.

10. The radio set of claim 9 further including a voice detector which is connected to said first bit rate converter in a transmitter, thereby introducing a delay corresponding to a time required for detection of a voice signal and wherein at an output of said voice detector a control signal is available for switching off portions of the radio set not required for the reception operation.

11. A radio set for a frequency division multiplexed, time division multiplexed radio transmission system including:
   a transmission device including a transmission mixer connected to a main local oscillator to convert the transmission signal into the transmission frequency position, whereby transmission and reception frequency of the two radio channels are equal in a duplex operation;
   a multiple superheterodyne reception device including a first receiving mixer connected to the main local oscillator for converting the received signal into the intermediary frequency position; a first bit rate converter for varying the bit rate of the transmission signals and a second bit rate converter connected to said first receiving mixer for varying the bit rate of the reception signals; a switching means connected to a transmission and reception antenna and for switching between transmission and reception operation connected to a transmission amplifier and to the first receiving mixer; and wherein a first auxiliary oscillator means is disposed in the transmission device which is connected to the transmission mixer and wherein during the reception operation the transmission path between said transmission mixer and a power supply device is interrupted by the switch means.

12. The radio set of claim 11 further including a second receiving mixer disposed between said main local oscillator and a first input of said first receiving mixer, wherein the output signal of a second auxiliary oscillator means is applied to a second input of said second receiving mixer, and wherein the sum or difference of frequencies from said main local oscillator and said second auxiliary oscillator means is used for frequency conversion in said first receiving mixer.

13. The radio set of claim 12 further including a second receiving mixer disposed between said main local oscillator and a first input of said first receiving mixer wherein the output signal of the first auxiliary oscillator means is applied to a second input of said second receiving mixer and wherein frequency conversion in the transmission mixer and said first receiving mixer uses the sum or difference of frequencies from said main local oscillator and said first auxiliary oscillator means.

14. The radio set of claim 11 wherein said bit rate converter comprises a flexible storage.

15. The radio set of claim 14 further including a voice detector which is connected to said first bit rate converter in a transmitter, thereby introducing a delay corresponding to a time required for detection of a voice signal and wherein at an output of said voice detector of control signal is available for switching off portions of the radio set not required for the reception operation.

* * * * *